US012294429B2

(12) United States Patent
Cao et al.

(10) Patent No.: US 12,294,429 B2
(45) Date of Patent: May 6, 2025

(54) ANTENNA PORTS DETERMINATION OF UL TX SWITCHING

(71) Applicant: QUALCOMM Incorporated, San Diego, CA (US)

(72) Inventors: Yiqing Cao, Beijing (CN); Peter Gaal, San Diego, CA (US); Alberto Rico Alvarino, San Diego, CA (US); Enoch Shiao-Kuang Lu, San Diego, CA (US); Wanshi Chen, San Diego, CA (US); Kazuki Takeda, Minato-ku (JP); Yan Li, Beijing (CN); Zhimin Du, Beijing (CN); Bin Han, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 18/268,909

(22) PCT Filed: Mar. 3, 2021

(86) PCT No.: PCT/CN2021/078842
§ 371 (c)(1),
(2) Date: Jun. 21, 2023

(87) PCT Pub. No.: WO2022/183397
PCT Pub. Date: Sep. 9, 2022

(65) Prior Publication Data
US 2024/0297693 A1    Sep. 5, 2024

(51) Int. Cl.
*H04B 7/06*    (2006.01)
*H04L 5/00*    (2006.01)

(52) U.S. Cl.
CPC ........... *H04B 7/0608* (2013.01); *H04L 5/001* (2013.01)

(58) Field of Classification Search
CPC .. H04B 7/0602; H04B 7/0608; H04B 7/0413; H04B 7/0604; H04L 5/001; H04L 5/0007
See application file for complete search history.

(56) References Cited

U.S. PATENT DOCUMENTS

2012/0127948 A1* 5/2012 Chung ................ H04L 5/0053
370/329
2015/0215793 A1* 7/2015 Siomina .............. H04W 64/00
455/456.1

(Continued)

FOREIGN PATENT DOCUMENTS

| CN | 110650473 A | 1/2020 |
| WO | 2020028366 A1 | 2/2020 |
| WO | 2020075090 A1 | 4/2020 |

OTHER PUBLICATIONS

International Search Report and Written Opinion—PCT/CN2021/078842—ISA/EPO—Dec. 1, 2021.

(Continued)

*Primary Examiner* — Khanh C Tran
(74) *Attorney, Agent, or Firm* — Procopio, Cory, Hargreaves & Savitch LLP

(57) ABSTRACT

A UE may determine a number of antenna ports associated with a frequency band that includes one or more CCs. The determined number of antenna ports may be based on a plurality of UL Tx chains for the one or more CCs/frequency band. The UE may switch from a first UL Tx chain to a second UL Tx chain, at least one of which may be associated with the one or more CCs/frequency band. The number of antenna ports may correspond to a maximum number of antenna ports of an individual CC of the one or more CCs, or to a sum of antenna ports of the one or more CCs. For the latter, the number of antenna ports may be limited to an (Continued)

available number of UE antenna ports when the sum of antenna ports is greater than the available number of UE antenna ports.

20 Claims, 9 Drawing Sheets

(56) References Cited

U.S. PATENT DOCUMENTS

| | | |
|---|---|---|
| 2019/0253214 A1 | 8/2019 | Liu et al. |
| 2020/0037383 A1 | 1/2020 | Rico Alvarino et al. |
| 2023/0155635 A1* | 5/2023 | Seyed .................. H04B 7/0602 370/280 |
| 2023/0397024 A1* | 12/2023 | Ashiwal .................. H04L 5/001 |

OTHER PUBLICATIONS

Qualcomm Incorporated: "Discussion of UL Switching Impact", 3GPP TSG RAN WG1 #100-e, R1-2001219, Mar. 6, 2020 (Mar. 6, 2020), 11 Pages, The Whole Document.
Supplementary European Search Report—EP21928488—Search Authority—The Hague—Nov. 15, 2024.

* cited by examiner

ANTENNA PORTS DETERMINATION OF UL TX SWITCHING

CROSS REFERENCE TO RELATED APPLICATION(S)

This application is a National Stage Application filed under 35 U.S.C. § 371 of PCT International Application No. PCT/CN2021/078842, entitled "ANTENNA PORTS DETERMINATION OF UL TX SWITCHING" and filed Mar. 3, 2021, which is expressly incorporated by reference herein in its entirety.

BACKGROUND

Technical Field

The present disclosure relates generally to communication systems, and more particularly, to an antenna ports determination for uplink (UL) transmit (Tx) switching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may determine a number of antenna ports associated with a frequency band that includes one or more component carriers (CCs), the number of antenna ports based on a plurality of uplink (UL) transmit (Tx) chains for at least one of the one or more CCs or the frequency band; and switch from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band.

In another aspect of the disclosure, a method, a computer-readable medium, and an apparatus are provided. The apparatus may receive, from a UE, at least one indication of at least one UE capability, each UE capability indicated by the UE corresponding to a respective frequency band; determine, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs; and transmit, to the UE, the configuration for switching from the first UL Tx chain to the second UL Tx chain, at least one of the first UL Tx chain or the second UL Tx chain associated with at least one of the one or more CCs or the frequency band.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
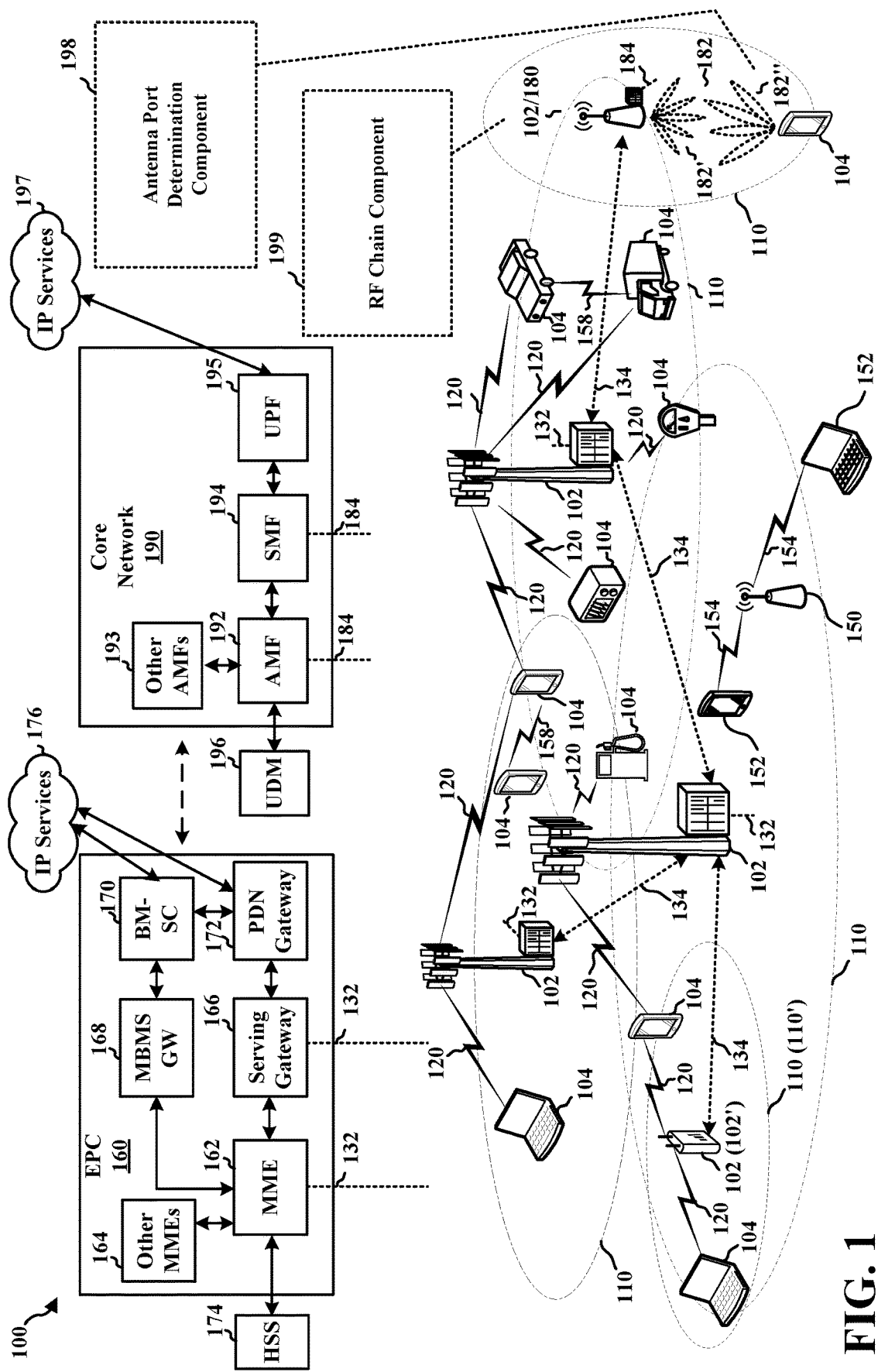
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an antenna port determination component 198 configured to determine a number of antenna ports associated with a frequency band that includes one or more component carriers (CCs), the number of antenna ports based on a plurality of UL transmit (Tx) chains for at least one of the one or more CCs or the frequency band; and switch from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band. In certain aspects, the base station 180 may include a radio frequency (RF) chain component 199 configured to receive, from a UE, at least one indication of at least one UE capability, each UE capability indicated by the UE corresponding to a respective frequency band; determine, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs; and transmit, to the UE, the configuration for switching from the first UL Tx chain to the second UL Tx chain, at least one of the first UL Tx chain or the second UL Tx chain associated with at least one of the one or more CCs or the frequency band. Although the following description may be focused on 5G NR, the concepts described herein may be applicable to other similar areas, such as LTE, LTE-A, CDMA, GSM, and other wireless technologies.

Figure 2:
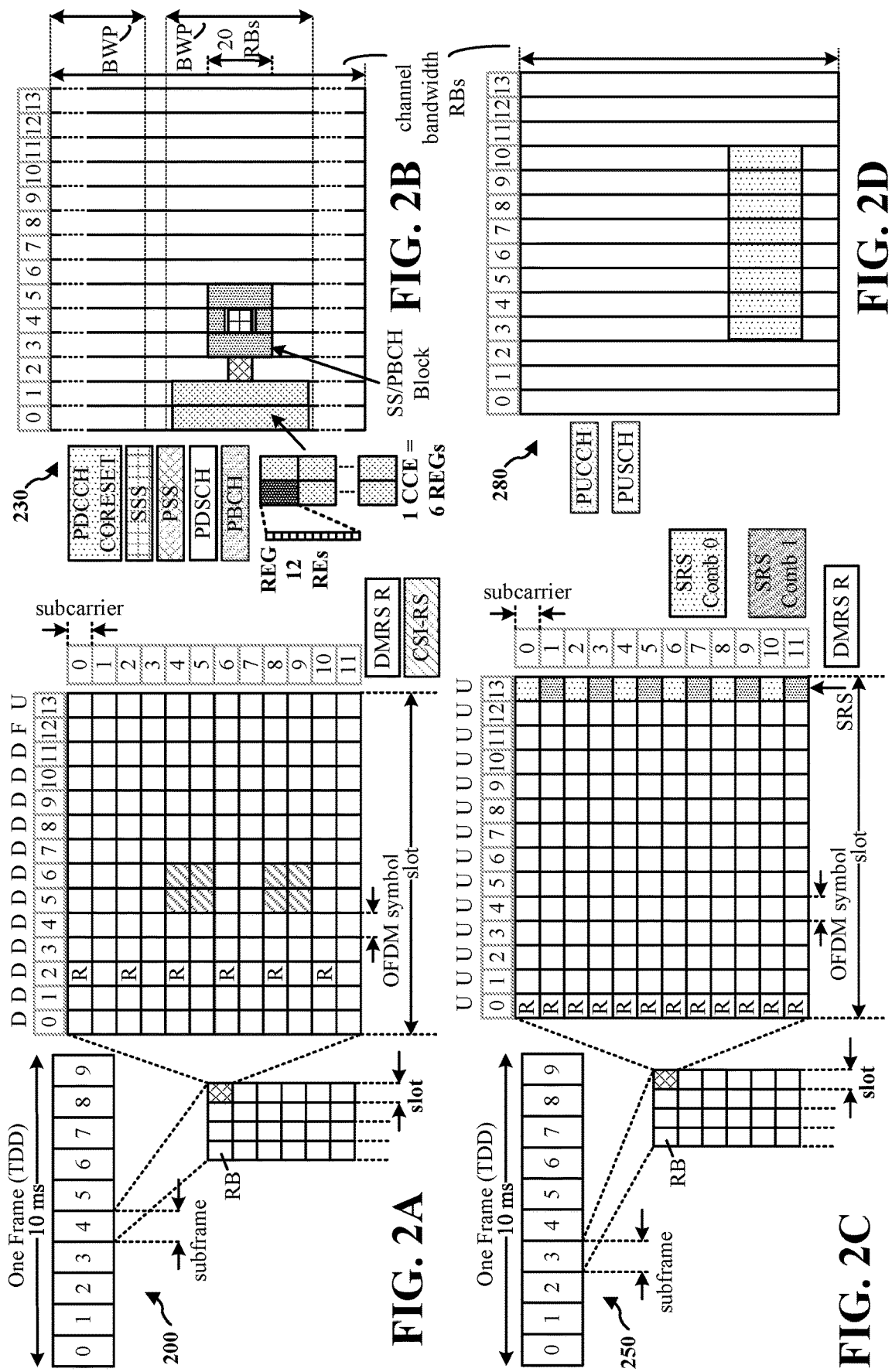
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
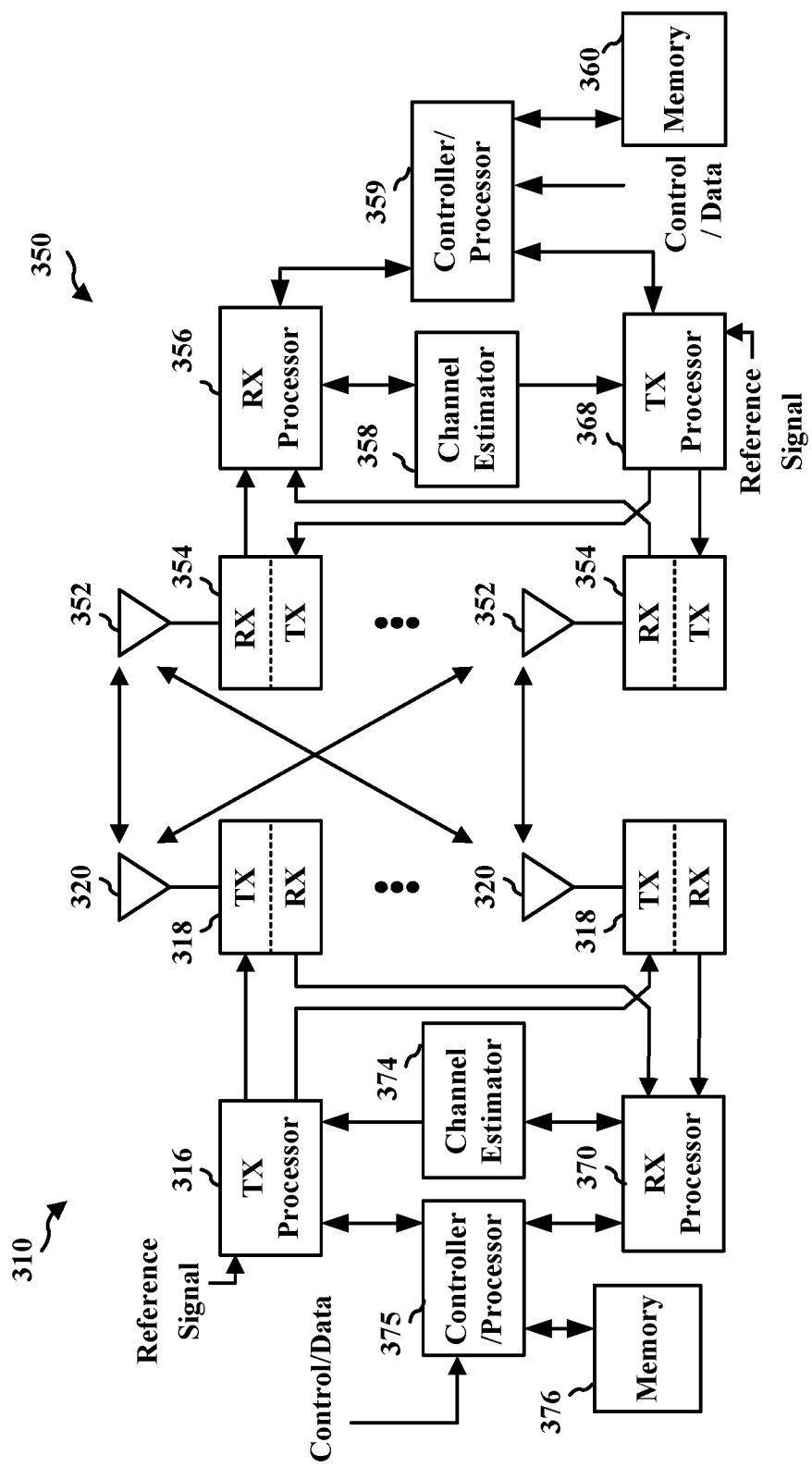
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the antenna port determination component 198 of FIG. 1.

At least one of the TX processor 316, the RX processor 370, and the controller/processor 375 may be configured to perform aspects in connection with the RF chain component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
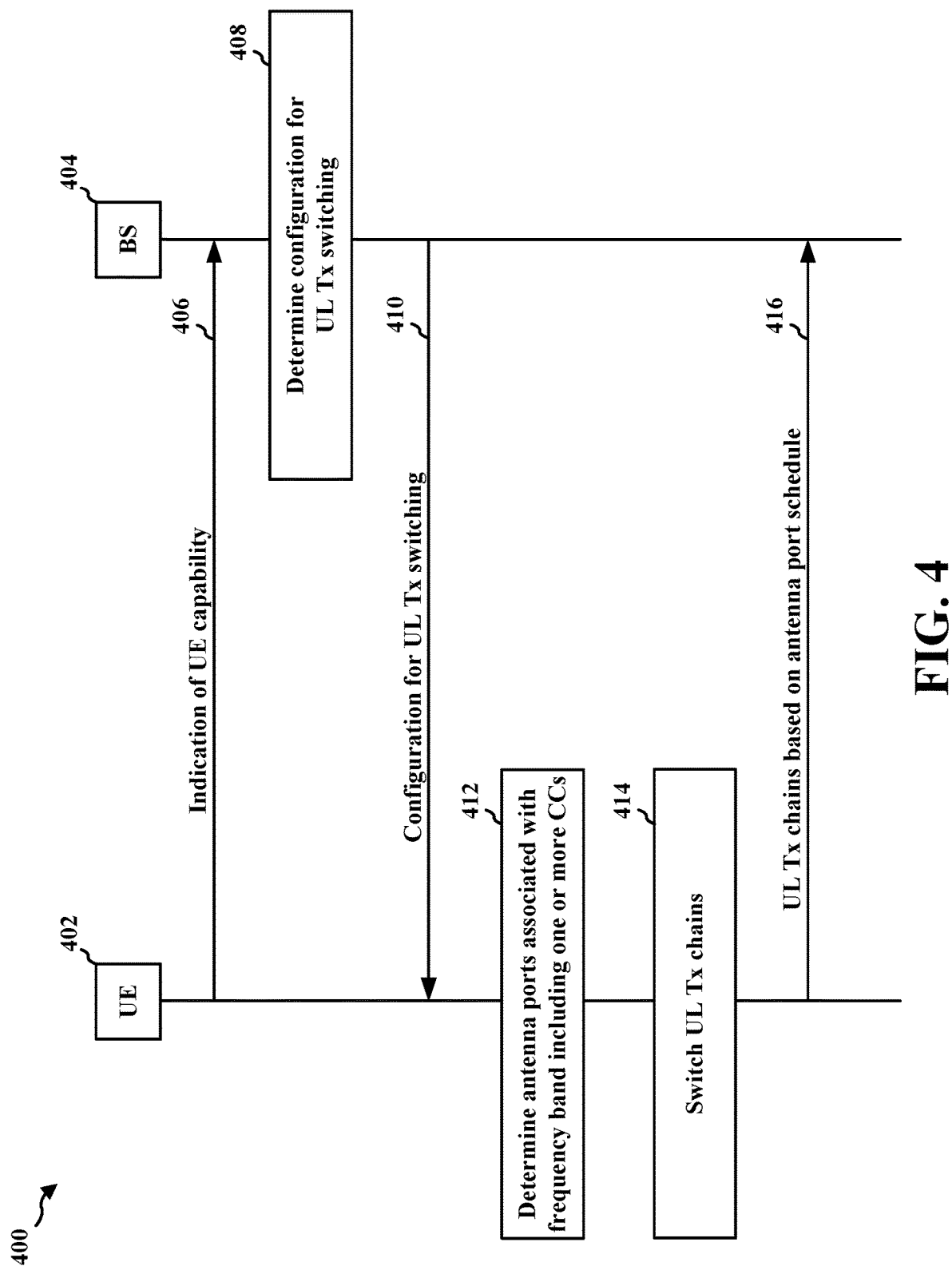
FIG. 4 is a call flow diagram illustrating communications between a UE and a base station.

FIG. 4 is a call flow diagram 400 illustrating communications between a UE 402 and a base station 404. The communications may be performed to determine a number of antenna ports (e.g., one antenna port, two antenna ports, etc.) for a frequency band that includes one or more CCs. At 406, the UE 402 may transmit an indication of a UE capability to the base station 404. For example, the UE 402 may report at least one indication of at least one UE capability to the base station 404 on a per frequency band basis, e.g., the UE 402 may report the UE capability for a first frequency band or a second frequency band, or the UE 402 may report two separate UE capabilities for the first frequency band and the second frequency band. The UE capability may be indicative of whether the UE 402 is capable of using a single UL Tx chain for the frequency band that includes the one or more CCs. An UL Tx chain may include a power amplifier and/or other RF components.

At 408, the base station 404 may determine a configuration for UL Tx switching based on the indication received, at 406, from the UE 402. The configuration may be based on a switch from a first UL Tx chain to a second UL Tx chain performed in association with a number of antenna ports determined for the frequency band that includes the one or more CCs. At 410, the base station 404 may transmit, to the UE 402, the configuration for the UL Tx switching.

At 412, the UE 402 may determine antenna ports associated with the frequency band including the one or more CCs. For example, the UE 402 may determine a number of antenna ports (e.g., one antenna port, two antenna ports, etc.) for the frequency band. At 414, the UE 402 may switch UL Tx chains (e.g., based on the configuration for UL Tx switching received, at 410, from the base station 404). The switch of the UL Tx chains, at 414, may be between different CCs and/or frequency bands. At 416, the UE 402 may transmit the UL Tx chains to the base station 404 based on an antenna port schedule.

Figure 5:
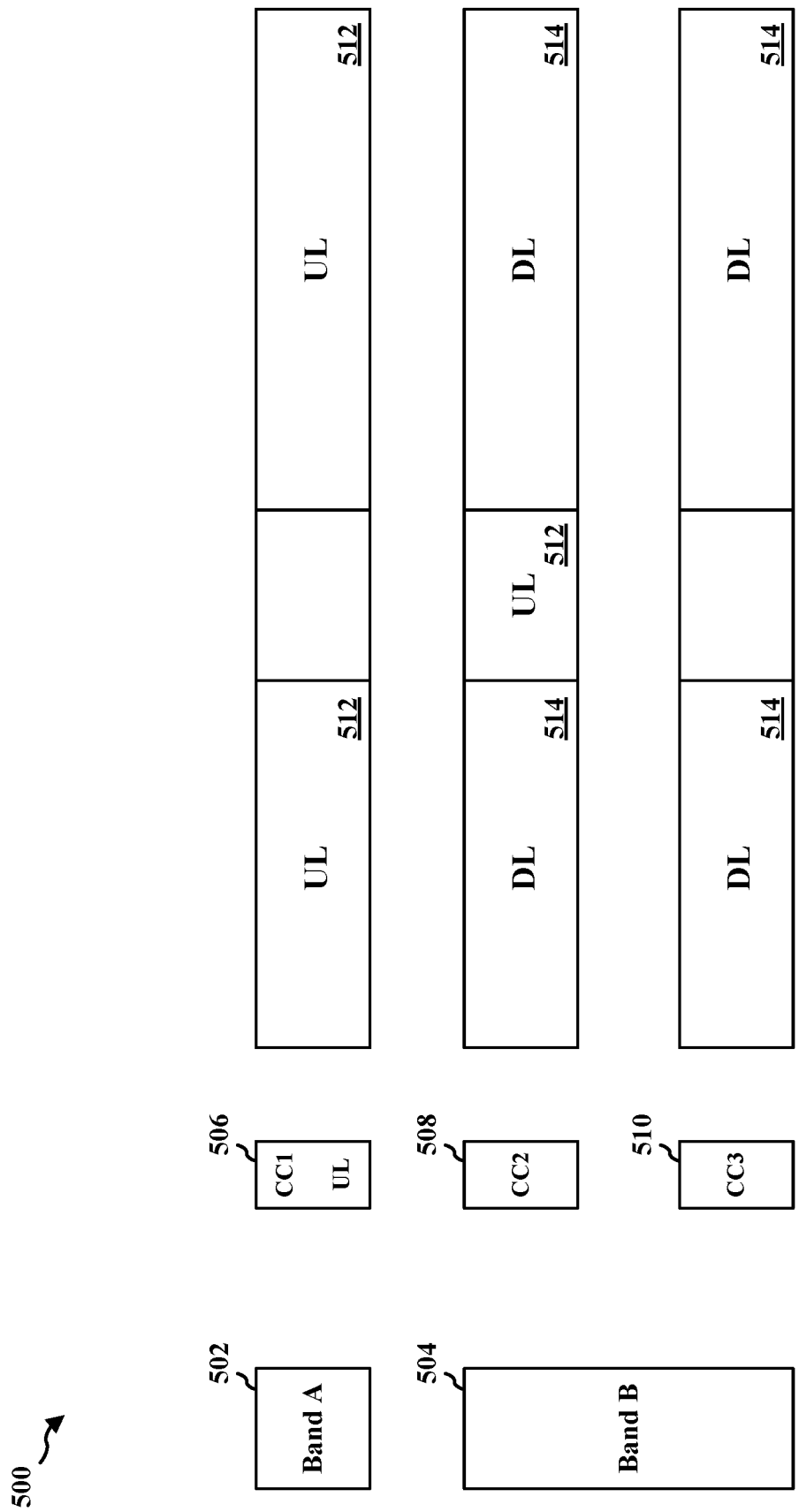
FIG. 5 is a diagram illustrating a first frequency band and a second frequency band that each include one or more component carriers (CCs).

FIG. 5 is a diagram 500 illustrating a first frequency band (e.g., band A 502) and a second frequency band (e.g., band B 504) that each include one or more CCs. UL Tx switching may be performed by a UE based on a thermal limitation and/or a power consumption of the UE. An UL Tx chain may include two separate UL Tx chains. Thus, inter-carrier aggregation for two frequency bands may include separate UL Tx chains for each of the two frequency bands (e.g., a first UL Tx chain for band A 502 and a second UL Tx chain for band B 504). In some configurations, a UE may be capable of performing UL Tx switching for more than two frequency bands. In such cases, the UE may be configured to utilize more than two UL Tx chains for performing the UL Tx switching.

UL Tx switching determinations for inter-band carrier aggregation may be based on switching between a first band/band A 502 and a second band/band B 504. In some examples, band A 502 may correspond to band n1, and band B 504 may correspond to band n78. The first band (e.g., band n1) may be an FDD band and the second band (e.g., band n78) may be a TDD band. While some UL Tx switching procedures may be based on an assumption that each of band A 502 and band B 504 corresponds to 1 CC, other UL Tx switching procedures may be based on at least one band that includes more than 1 CC. For instance, the band B 504, which may correspond to band n78, may include 2 CCs (e.g., CC2 508 and CC3 510). UL Tx switching between different frequency bands may enable UL MIMO operations on the PCell. UL MIMO operations may also be enabled on the SCell, which may be associated with a larger bandwidth than the PCell. TDD bands may include a larger bandwidth than FDD bands. For example, a TDD band may include 100 MHz of bandwidth, which may be fully utilized in some 5G NR applications.

In cases such as different mobile carriers jointly utilizing a same frequency spectrum, the different mobile carriers may determine to perform communications based on both UL intra-band carrier aggregation and UL inter-band carrier aggregation. Intra-band carrier aggregation may be associated with an aggregation of CC2 508 with CC3 510, whereas inter-band carrier aggregation may be associated with an aggregation of CC1 506 (e.g., included in band A 502) with at least one of CC2 508 or CC3 510 (e.g., included in band B 504). The different mobile carriers/UEs that jointly utilize the same frequency spectrum may be each assigned 100 MHz of bandwidth, e.g., at band B 504, which may have a total bandwidth of 200 MHz. The different mobile carriers/UEs may each also be assigned 50 MHz of bandwidth at band A 502, which may be associated with one channel or multiple channels depending on a deployment configuration of the different mobile carriers/UEs.

In some examples, the UE may determine that contiguous CCs are to be considered as a single CC when determining whether to perform an UL Tx switching procedure. In other configurations, the UE may separately consider each of the intra-band CCs of a frequency band before determining to perform the UL Tx switching procedure. Accordingly, a difference between determining that contiguous CCs of the frequency band are to be considered as a single CC and determining that intra-band CCs are to be considered separately may result in an ambiguity for determining the number of CCs associated with the frequency band (e.g., band B 504). The determination of whether the frequency band (e.g., band B 504) is to be associated with one CC or a plurality of CCs may be based on a capability of the UE.

The UE may report the capability of the UE to a base station, where a number of antenna ports used for UL transmission may be based on the reported/determined capability of the UE. In a first aspect, the number of antenna ports may correspond to a maximum number of antenna ports of an individual CC in the frequency band. For example, if CC2 508 is associated with one antenna port and CC3 510 is also associated with one antenna port, the maximum number of antenna ports for any one of the CCs 508-510 may be one antenna port. Therefore, band B 504 may be associated with one antenna port. If CC2 508 is instead associated with two antenna ports, and CC3 510 is still associated with one antenna port, then band B 504 may be associated with two antenna ports, as the maximum number of antenna ports for any one of the CCs is two antenna ports. When determining the maximum number of antenna ports in such cases, the UE may utilize a single UL Tx chain for all of the CCs in the frequency band, regardless of the number of CCs within the frequency band or a size of channel bandwidths of the frequency band.

The UE may alternatively utilize more than one UL Tx chain for the frequency band. A UE that utilizes more than one UL Tx chain for the frequency band may have a decreased capability in comparison to a UE that utilizes a single UL Tx chain for the frequency band. In a second aspect, the number of antenna ports may correspond to a sum of the antenna ports of the CCs included in the frequency band. For example, if CC2 508 is associated with one antenna port and CC3 510 is also associated with one antenna port, the number of antenna ports for band B 504 may be two antenna ports, based on the sum of the antenna ports associated with CC2 508 and CC3 510 being two antenna ports. If the sum of the antenna ports exceeds a maximum number of UE antenna ports (e.g., exceeds the UE capability), the number of antenna ports may be limited to the maximum number of UE antenna ports.

Band A 502 may include one CC (e.g., CC1 506), which may be used for transmitting on UL, whereas band B 504 may include two CCs (e.g., CC2 508 and CC3 510), which may be used for transmitting on DL and/or UL. Band A 502 may be an FDD band that includes two UL portions 512 and no DL portions 514. Band B 504 may be a TDD band that includes two DL portions 514 and/or UL portions 512. The UE may determine a schedule for the antenna ports based on whether the frequency bands are considered as including a single CC or a plurality of CCs.

The UE may report the capability of the UE to the base station for scheduling the antenna ports based on the maximum number of antenna ports for an individual CC, or based on the sum of the antenna ports of the CCs. The UE may transmit a capability report to the base station based on a single UL Tx chain, which may include a single power amplifier and/or other RF components, or based on separate UL Tx chains, which may include separate power amplifiers and/or other RF components. Such indications may depend on the capability of the UE. In some cases, a single UL Tx chain/power amplifier may be used for two CCs (e.g., CC2 508 and CC3 510) of a single band (e.g., band B 504). That is, one antenna port for CC2 508 plus one antenna port for CC3 510 determined based on intra-band carrier aggregation may correspond to one antenna port for band B 504. When a single UL Tx chain/power amplifier is not used for multiple CCs of a frequency band, separate UL Tx chains/power amplifiers may be used for the multiple CCs of the frequency band. That is, one antenna port for CC2 508 plus one antenna port for CC3 510 determined based on intra-band carrier aggregation may correspond to two antenna ports for band B 504.

The UE may report the capability of the UE based on the single UL Tx chain/power amplifier or based on the separate UL Tx chains/power amplifiers when the frequency band is configured for UL Tx switching. If the UE does not report the capability of the UE to the base station, a default configuration may be assumed by the base station. The default configuration may be that UL transmissions will be performed based on either the single UL Tx chain/power amplifier or the separate UL Tx chains/power amplifiers. When the UE reports the capability of the UE to the base station based on the single UL Tx chain/power amplifier, the number of antenna ports may be determined based on the maximum number of antenna ports of an individual CC of the frequency band. When the UE reports the capability of the UE to the base station based on separate UL Tx chains/power amplifiers, the number of antenna ports may be determined based on a sum of the antenna ports of the CCs of the frequency band.

Figure 6:
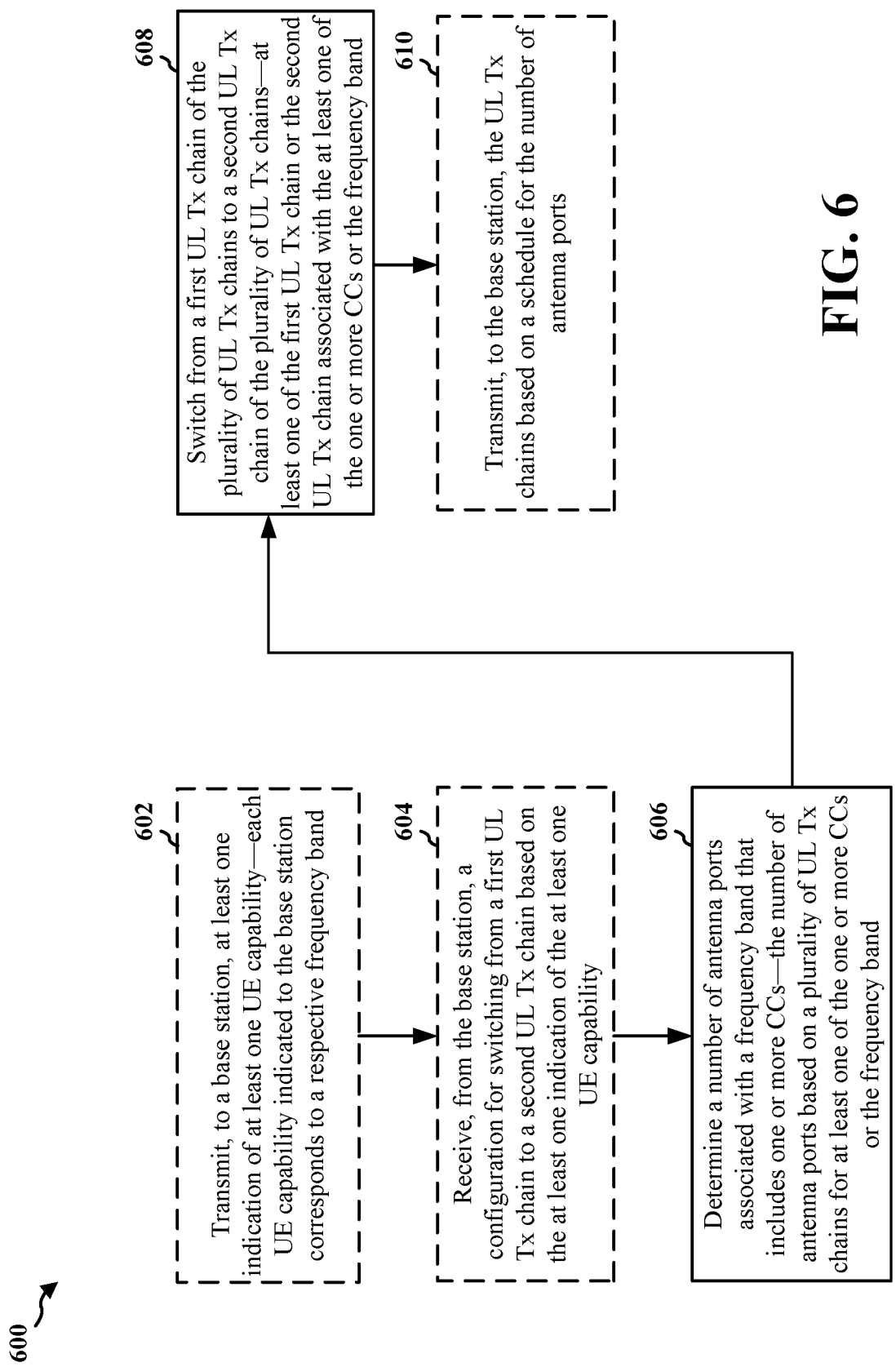
FIG. 6 is a flowchart of a method of wireless communication at a UE.

FIG. 6 is a flowchart 600 of a method of wireless communication. The method may be performed by a UE (e.g., the UE 104/402; the apparatus 802; etc.), which may include the memory 360 and which may be the entire UE 104/402 or a component of the UE 104/402, such as the TX processor 368, the RX processor 356, and/or the controller/processor 359.

At 602, the UE may transmit, to a base station, at least one indication of at least one UE capability—each UE capability indicated to the base station corresponds to a respective frequency band. For example, referring to FIGS. 4-5, the UE 402 may transmit, at 406, an indication of the UE capability to the base station 404. The UE 402 may report the at least one UE capability on a per frequency band basis, e.g., the UE 402 may report the UE capability for band A 502 or band B 504, or the UE 402 may report two separate UE capabilities for band A 502 and band B 504. The at least one UE capability may be indicative of whether the UE 402 is capable of using a single UL Tx chain for the frequency band (e.g., band B 504). In a first aspect, the at least one indication of the at least one UE capability may be based on a single UL Tx chain of the plurality of UL Tx chains, e.g., a single power amplifier for one or more CCs (e.g., CC2 508, and/or CC3 510) of the frequency band (e.g., band B 504). In a second aspect, the at least one indication of the at least one UE capability may be based on separate UL Tx chains of the plurality of UL Tx chains, e.g., separate power amplifiers for the one or more CCs (e.g., CC2 508, and/or CC3 510) of the frequency band (e.g., band B 504). In a third aspect, at least one UE capability may be based on a default capability associated with a single UL Tx chain of the plurality of UL Tx chains (e.g., single power amplifier) or separate UL Tx chains of the plurality of UL Tx chains (e.g., separate power amplifiers) when the at least one UE capability is not transmitted to the base station 404. The transmission may be performed, e.g., by the transmission component 834 of the apparatus 802 in FIG. 8.

At 604, the UE may receive, from the base station, a configuration for switching from a first UL Tx chain to a second UL Tx chain based on the at least one indication of the at least one UE capability. For example, referring to FIG. 4, the UE 402 may receive, at 410, a configuration for UL Tx switching from the base station 404, based on the indication of the at least one UE capability transmitted, at 406, to the base station. The reception may be performed, e.g., by the reception component 830 of the apparatus 802 in FIG. 8.

At 606, the UE may determine a number of antenna ports associated with a frequency band that includes one or more CCs—the number of antenna ports based on a plurality of UL Tx chains for at least one of the one or more CCs or the frequency band. For example, referring to FIGS. 4-5, the UE 402 may determine, at 412, antenna ports associated with a frequency band including one or more CCs. The number of antenna ports may be determined, at 412, if the UE 402 is configured for an UL Tx switching mode. In the first aspect, the number of antenna ports may correspond to a maximum number of antenna ports of an individual CC (e.g., CC1 506, CC2 508, or CC3 510) of the one or more CCs included in one or more frequency bands (e.g., band A 502 or band B 504) configured for UL Tx switching. In some examples, the maximum number of antenna ports may be based on UE implementation, and may not be reported by the UE. In the second aspect, the number of antenna ports may correspond to a sum of antenna ports of the one or more CCs (e.g., CC1 506, CC2 508, or CC3 510) included in the frequency band (e.g., band A 502 or band B 504). The number of antenna ports may be limited to an available number of UE antenna ports when the sum of antenna ports is greater than the available number of UE antenna ports. The determination may be performed, e.g., by the determination component 840 of the apparatus 802 in FIG. 8.

At 608, the UE may switch from a first UL Tx chain of the plurality of UL Tx chains to a second UL Tx chain of the plurality of UL Tx chains—at least one of the first UL Tx chain or the second UL Tx chain associated with the at least one of the one or more CCs or the frequency band. For example, referring to FIGS. 4-5, the UE 402 may switch, at 414, UL Tx chains. In the first aspect, the first UL Tx chain may correspond to the frequency band (e.g., band B 504) and the second UL Tx chain may correspond to a different frequency band (e.g., band A 502). At least one of the frequency band (e.g., band B 504) or the different frequency band (e.g., band A 502) may be configured for UL Tx switching. In the second aspect, the first UL Tx chain and the second UL Tx chain may correspond to the frequency band (e.g., band B 504), where the frequency band (e.g., band B 504) may be configured for UL Tx switching. The switch may be performed, e.g., by the switcher component 842 of the apparatus 802 in FIG. 8.

At 610, the UE may transmit, to the base station, the plurality of UL Tx chains based on a schedule for the number of antenna ports. For example, referring to FIG. 4, the UE 402 may transmit, at 416, UL Tx chains to the base station 404 based on an antenna port schedule. The transmission may be performed, e.g., by the transmission component 834 of the apparatus 802 in FIG. 8.

Figure 7:
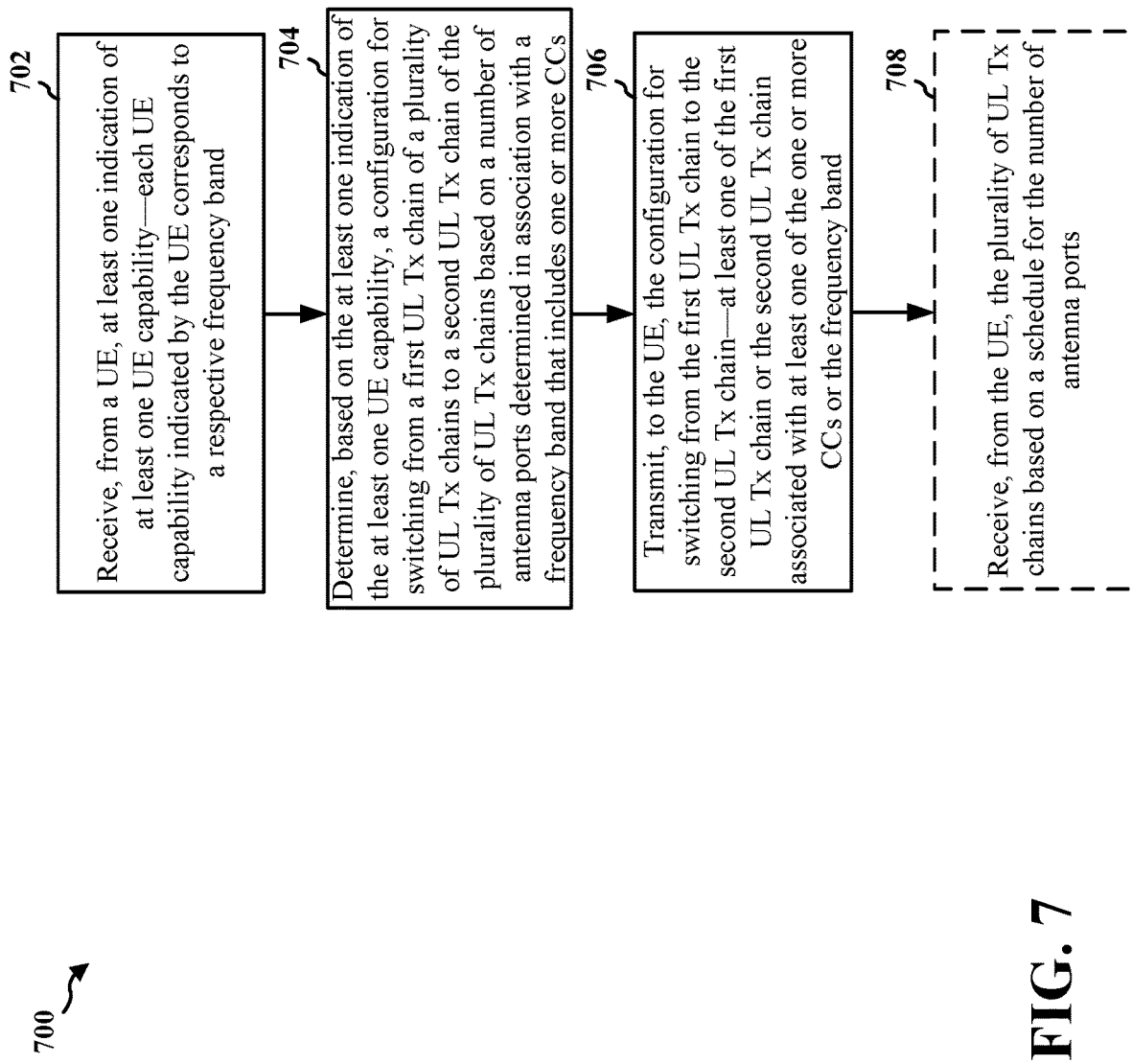
FIG. 7 is a flowchart of a method of wireless communication at a base station.

FIG. 7 is a flowchart 700 of a method of wireless communication. The method may be performed by a base station (e.g., the base station 102/404; the apparatus 902; etc.), which may include the memory 376 and which may be the entire base station 102/404 or a component of the base station 102/404, such as the TX processor 316, the RX processor 370, and/or the controller/processor 375.

At 702, the base station may receive, from a UE, at least one indication of at least one UE capability—each UE capability indicated by the UE corresponds to a respective frequency band. For example, referring to FIGS. 4-5, the base station 404 may receive, at 406, an indication of a UE capability from the UE 402. The base station 404 may receive the at least one UE capability on a per frequency band basis, e.g., the base station 404 may receive a UE capability for band A 502 or band B 504, or the base station 404 may receive two separate UE capabilities for band A 502 and band B 504. The at least one UE capability may be indicative of whether the UE 402 is capable of using a single UL Tx chain for the frequency band (e.g., band B 504). In a first aspect, the at least one indication of the at least one UE capability may be based on a single UL Tx chain of the plurality of UL Tx chains, e.g., a single power amplifier for one or more CCs (e.g., CC2 508, and/or CC3 510) of the frequency band (e.g., band B 504). In a second aspect, the at least one indication of the at least one UE capability may be based on separate UL Tx chains of the plurality of UL Tx chains, e.g., separate power amplifiers for the one or more CCs (e.g., CC2 508, and/or CC3 510) of the frequency band (e.g., band B 504). In a third aspect, at least one UE capability may be based on a default capability associated with a single UL Tx chain of the plurality of UL Tx chains (e.g., single power amplifier) or separate UL Tx chains of the plurality of UL Tx chains (e.g., separate power amplifiers) when the at least one UE capability is not transmitted to the base station 404. The reception may be performed, e.g., by the reception component 930 of the apparatus 902 in FIG. 9.

At 704, the base station may determine, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs. For example, referring to FIGS. 4-5, the base station 404 may determine, at 408, a configuration for UL Tx switching based on the indication of the UE capability received, at 406, from the UE 402. In the first aspect, the number of antenna ports may correspond to a maximum number of antenna ports of an individual CC (e.g., CC1 506, CC2 508, or CC3 510) of the one or more CCs included in one or more frequency bands (e.g., band A 502 or band B 504) configured for UL Tx switching. In some examples, the maximum number of antenna ports may be based on UE implementation, and may not be reported by the UE. The first UL Tx chain may correspond to the frequency band (e.g., band B 504) and the second UL Tx chain may correspond to a different frequency band (e.g., band A 502). At least one of the frequency band (e.g., band B 504) or the different frequency band (e.g., band A 502) may be configured for UL Tx switching. In the second aspect, the number of antenna ports may correspond to a sum of antenna ports of the one or more CCs (e.g., CC1 506, CC2 508, or CC3 510) included in the frequency band (e.g., band A 502 or band B 504). The number of antenna ports may be limited to an available number of UE antenna ports when the sum of antenna ports is greater than the available number of UE antenna ports. The first UL Tx chain and the second UL Tx chain may correspond to the frequency band (e.g., band B 504), where the frequency band (e.g., band B 504) may be configured for UL Tx switching. The determination may be performed, e.g., by the determination component 940 of the apparatus 902 in FIG. 9.

At 706, the base station may transmit, to the UE, the configuration for switching from the first UL Tx chain to the second UL Tx chain—at least one of the first UL Tx chain or the second UL Tx chain associated with at least one of the one or more CCs or the frequency band. For example, referring to FIG. 4, the base station 404 may transmit, at 410, the configuration for UL Tx switching to the UE 402. The transmission may be performed, e.g., by the transmission component 934 of the apparatus 902 in FIG. 9.

At 708, the base station may receive, from the UE, the plurality of UL Tx chains based on a schedule for the number of antenna ports. For example, referring to FIG. 4, the base station 404 may receive, at 416, UL Tx chains from the UE 402 based on an antenna port schedule. The reception may be performed, e.g., by the reception component 930 of the apparatus 902 in FIG. 9.

Figure 8:
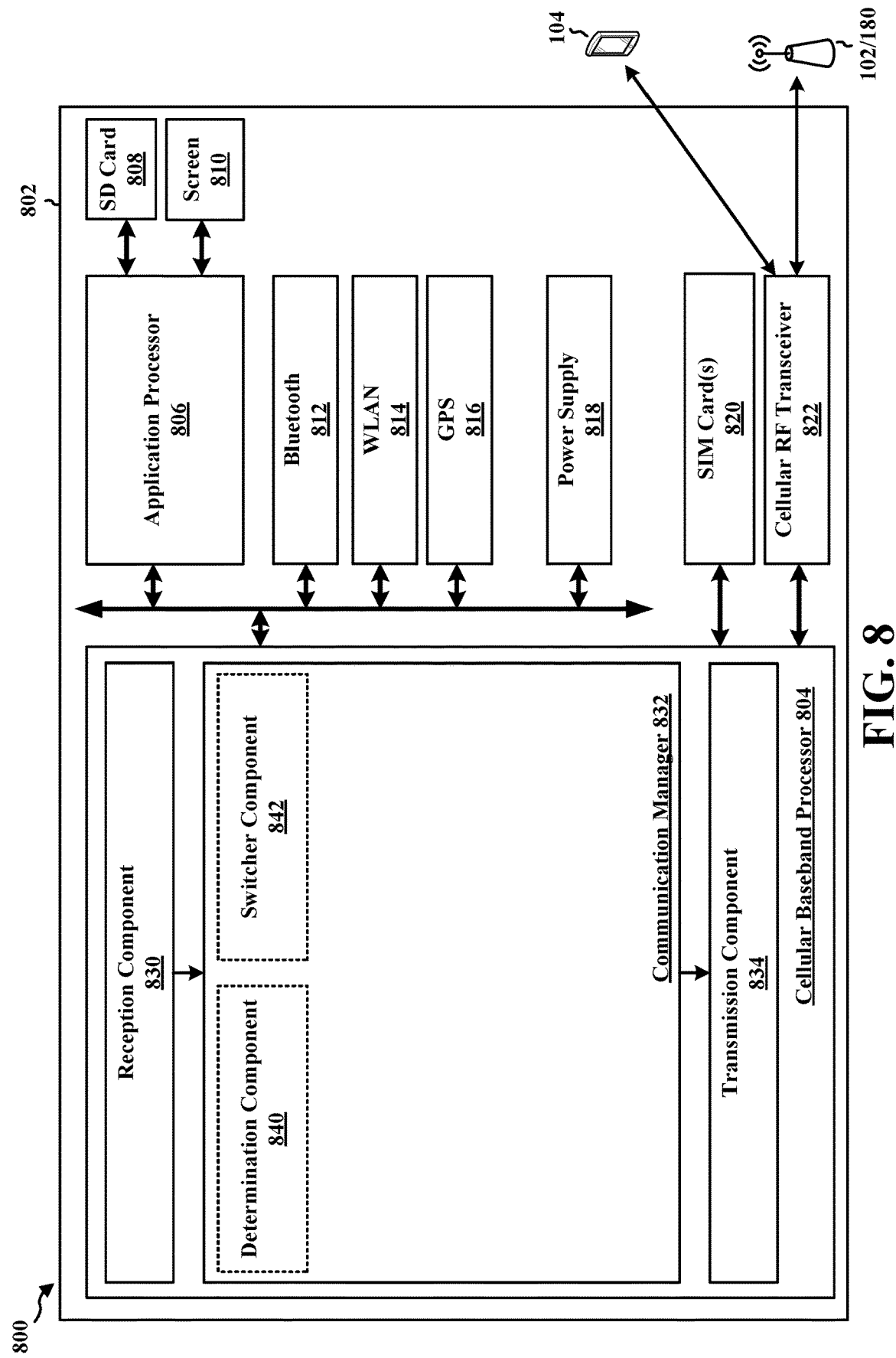
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The reception component 830 is configured, e.g., as described in connection with 604, to receive, from the base station, a configuration for switching from a first UL Tx chain to a second UL Tx chain based on the at least one indication of the at least one UE capability. The communication manager 832 includes a determination component 840 that is configured, e.g., as described in connection with 606, to determine a number of antenna ports associated with a frequency band that includes one or more CCs—the number of antenna ports based on a plurality of UL Tx chains for at least one of the one or more CCs or the frequency band. The communication manager 832 further includes a switcher component 842 that is configured, e.g., as described in connection with 608, to switch from a first UL Tx chain of the plurality of UL Tx chains to a second UL Tx chain of the plurality of UL Tx chains—at least one of the first UL Tx chain or the second UL Tx chain associated with the at least one of the one or more CCs or the frequency band. The transmission component 834 is configured, e.g., as described in connection with 602 and 610, to transmit, to a base station, at least one indication of at least one UE capability—each UE capability indicated to the base station corresponds to a respective frequency band; and to transmit, to the base station, the UL Tx chains based on a schedule for the number of antenna ports.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining a number of antenna ports associated with a frequency band that includes one or more CCs, the number of antenna ports based on a plurality of UL Tx chains for at least one of the one or more CCs or the frequency band; and means for switching from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band. The apparatus 802 further includes means for transmitting, to a base station, at least one indication of at least one UE capability. The apparatus 802 further includes means for receiving, from the base station, a configuration for switching from the first UL Tx chain to the second UL Tx chain based on the at least one indication of the at least one UE capability. The apparatus 802 further includes means for transmitting, to a base station, the plurality of UL Tx chains based on a schedule for the number of antenna ports.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
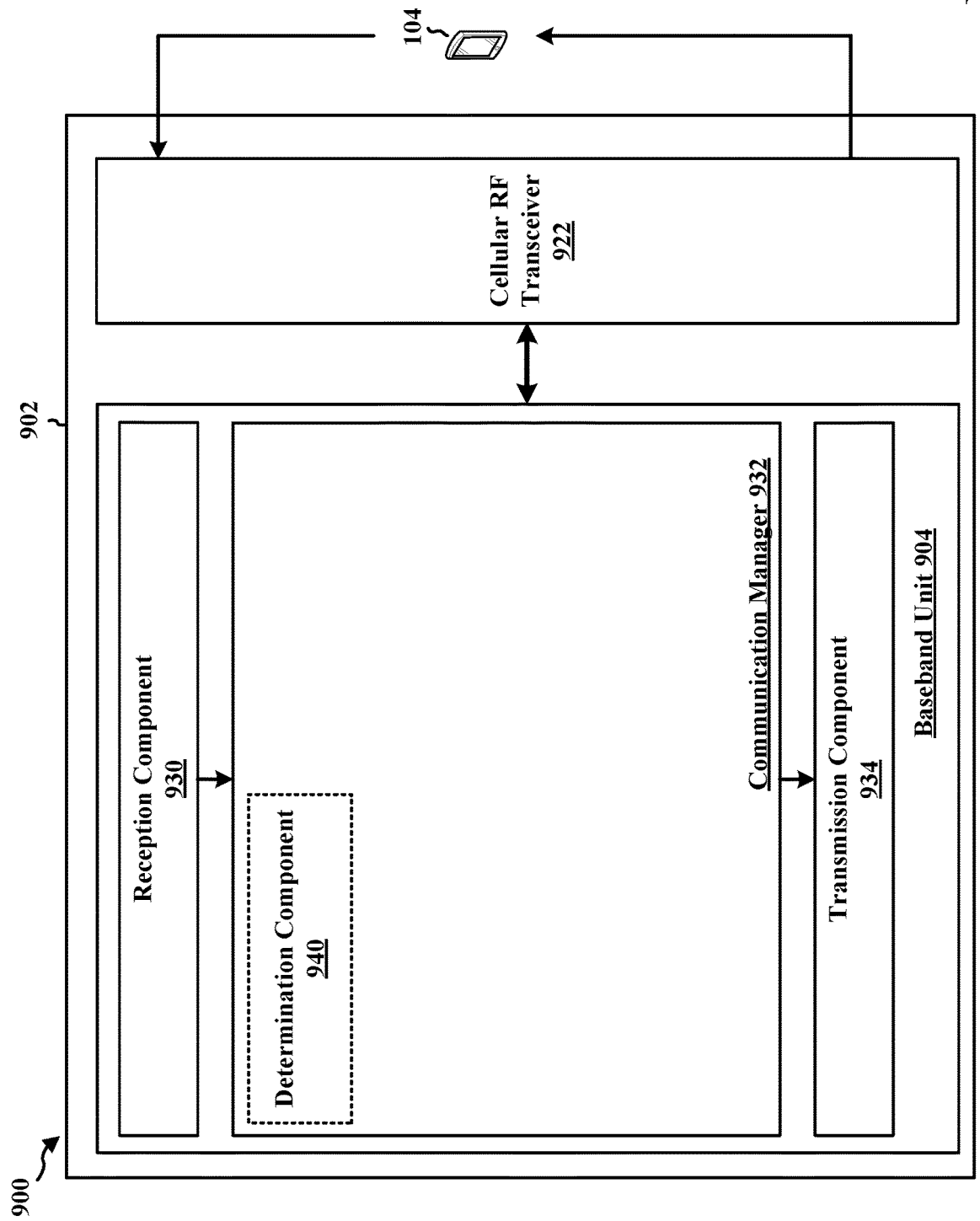
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The reception component 930 is configured, e.g., as described in connection with 702 and 708, to receive, from a UE, at least one indication of at least one UE capability, each UE capability indicated by the UE corresponds to a respective frequency band; and to receive, from the UE, the plurality of UL Tx chains based on a schedule for the number of antenna ports. The communication manager 932 includes a determination component 940 that is configured, e.g., as described in connection with 704, to determine, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs. The transmission component 934 is configured, e.g., as described in connection with 706, to transmit, to the UE, the configuration for switching from the first UL Tx chain to the second UL Tx chain—at least one of the first UL Tx chain or the second UL Tx chain associated with at least one of the one or more CCs or the frequency band.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, at least one indication of at least one UE capability; means for determining, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs; and means for transmitting, to the UE, the configuration for switching from the first UL Tx chain to the second UL Tx chain, at least one of the first UL Tx chain or the second UL Tx chain associated with at least one of the one or more CCs or the frequency band. The apparatus 902 further includes means for receiving, from the UE, the plurality of UL Tx chains based on a schedule for the number of antenna ports.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: determining a number of antenna ports associated with a frequency band that includes one or more CCs, the number of antenna ports based on a plurality of UL Tx chains for at least one of the one or more CCs or the frequency band; and switching from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band.

Aspect 2 may be combined with aspect 1 and includes that the number of antenna ports is determined if the UE is configured for an UL Tx switching mode.

Aspect 3 may be combined with any of aspects 1-2 and further includes transmitting, to a base station, at least one indication of at least one UE capability, each UE capability indicated to the base station corresponding to a respective frequency band.

Aspect 4 may be combined with any of aspects 1-3 and includes that the number of antenna ports corresponds to a maximum number of antenna ports of an individual CC of the one or more CCs, where the one or more CCs is included in one or more frequency bands configured for UL Tx switching.

Aspect 5 may be combined with any of aspects 1-4 and includes that the at least one indication of the at least one UE capability is based on a single UL Tx chain of the plurality of UL Tx chains.

Aspect 6 may be combined with any of aspects 1-5 and includes that the first UL Tx chain corresponds to the frequency band and the second UL Tx chain corresponds to a different frequency band, at least one of the frequency band or the different frequency band being configured for UL Tx switching.

Aspect 7 may be combined with any of aspects 1-3 and includes that the number of antenna ports corresponds to a sum of antenna ports of the one or more CCs, the number of antenna ports being limited to an available number of UE antenna ports when the sum of antenna ports is greater than the available number of UE antenna ports.

Aspect 8 may be combined with any of aspects 1-3 or 7 and includes that the at least one indication of the at least one UE capability is based on separate UL Tx chains of the plurality of UL Tx chains.

Aspect 9 may be combined with any of aspects 1-3 or 7-8 and includes that the first UL Tx chain and the second UL Tx chain corresponds to the frequency band, the frequency band being configured for UL Tx switching.

Aspect 10 may be combined with any of aspects 1-9 and includes that the at least one UE capability is indicative of whether the UE is capable of using a single UL Tx chain for the frequency band.

Aspect 11 may be combined with any of aspects 1-10 and further includes receiving, from the base station, a configuration for switching from the first UL Tx chain to the second UL Tx chain based on the at least one indication of the at least one UE capability.

Aspect 12 may be combined with any of aspects 1-11 and further includes transmitting, to a base station, the plurality of UL Tx chains based on a schedule for the number of antenna ports.

Aspect 13 may be combined with any of aspects 1-2 or 12 and includes that at least one UE capability is based on a default capability associated with a single UL Tx chain of the plurality of UL Tx chains or separate UL Tx chains of the plurality of UL Tx chains when the at least one UE capability is not transmitted to a base station.

Aspect 14 is a method of wireless communication at a base station, comprising: receiving, from a UE, at least one indication of at least one UE capability, each UE capability indicated by the UE corresponding to a respective frequency band; determining, based on the at least one indication of the at least one UE capability, a configuration for switching from a first UL Tx chain of a plurality of UL Tx chains to a second UL Tx chain of the plurality of UL Tx chains based on a number of antenna ports determined in association with a frequency band that includes one or more CCs; and transmitting, to the UE, the configuration for switching from the first UL Tx chain to the second UL Tx chain, at least one of the first UL Tx chain or the second UL Tx chain associated with at least one of the one or more CCs or the frequency band.

Aspect 15 may be combined with aspect 14 and further includes receiving, from the UE, the plurality of UL Tx chains based on a schedule for the number of antenna ports.

Aspect 16 may be combined with any of aspects 14-15 and includes that the number of antenna ports corresponds to a maximum number of antenna ports of an individual CC of the one or more CCs, where the one or more CCs is included in one or more frequency bands configured for UL Tx switching.

Aspect 17 may be combined with any of aspects 14-16 and includes that the at least one indication of the at least one UE capability is based on a single UL Tx chain of the plurality of UL Tx chains.

Aspect 18 may be combined with any of aspects 14-17 and includes that the first UL Tx chain corresponds to the frequency band and the second UL Tx chain corresponds to a different frequency band, at least one of the frequency band or the different frequency band being configured for UL Tx switching.

Aspect 19 may be combined with any of aspects 14-15 and includes that the number of antenna ports corresponds to a sum of antenna ports of the one or more CCs, the number of antenna ports being limited to an available number of UE antenna ports when the sum of antenna ports is greater than the available number of UE antenna ports.

Aspect 20 may be combined with any of aspects 14-15 or 19 and includes that the at least one indication of the at least one UE capability is based on separate UL Tx chains of the plurality of UL Tx chains.

Aspect 21 may be combined with any of aspects 14-15 or 19-20 and includes that the first UL Tx chain and the second UL Tx chain corresponds to the frequency band, the frequency band configured for UL Tx switching.

Aspect 22 may be combined with any of aspects 14-21 and includes that the at least one UE capability is indicative of whether the UE is capable of using a single UL Tx chain for the frequency band.

Aspect 23 may be combined with any of aspects 14-15 and includes that at least one UE capability is based on a default capability associated with a single UL Tx chain of the plurality of UL Tx chains or separate UL Tx chains of the plurality of UL Tx chains when the at least one UE capability is not received from the UE.

Aspect 24 is an apparatus for wireless communication including at least one processor coupled to a memory and configured to implement a method as in any of aspects 1-23.

Aspect 25 is an apparatus for wireless communication including means for implementing a method as in any of aspects 1-23.

Aspect 26 is a computer-readable medium storing computer executable code, the code when executed by at least one processor causes the at least one processor to implement a method as in any of aspects 1-23.

What is claimed is:

1. A method of wireless communication at a user equipment (UE), comprising:
   determining a number of antenna ports associated with a frequency band that includes one or more component carriers (CCs), the number of antenna ports based on a plurality of uplink (UL) transmit (Tx) chains for at least one of the one or more CCs or the frequency band; and
   switching from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band.

2. The method of claim 1, wherein the number of antenna ports is determined if the UE is configured for an UL Tx switching mode.

3. The method of claim 1, further comprising transmitting, to a base station, at least one indication of at least one UE capability, each UE capability indicated to the base station corresponding to a respective frequency band.

4. The method of claim 3, wherein the number of antenna ports corresponds to a maximum number of antenna ports of an individual CC of the one or more CCs, and wherein the one or more CCs is included in one or more frequency bands configured for UL Tx switching.

5. The method of claim 4, wherein the at least one indication of the at least one UE capability is based on a single UL Tx chain of the plurality of UL Tx chains.

6. The method of claim 4, wherein the first UL Tx chain corresponds to the frequency band and the second UL Tx chain corresponds to a different frequency band, at least one of the frequency band or the different frequency band being configured for UL Tx switching.

7. The method of claim 3, wherein the number of antenna ports corresponds to a sum of antenna ports of the one or more CCs, the number of antenna ports being limited to an available number of UE antenna ports when the sum of antenna ports is greater than the available number of UE antenna ports.

8. The method of claim 7, wherein the at least one indication of the at least one UE capability is based on separate UL Tx chains of the plurality of UL Tx chains.

9. The method of claim 7, wherein the first UL Tx chain and the second UL Tx chain corresponds to the frequency band, the frequency band being configured for UL Tx switching.

10. The method of claim 3, wherein the at least one UE capability is indicative of whether the UE is capable of using a single UL Tx chain for the frequency band.

11. The method of claim 3, further comprising receiving, from the base station, a configuration for switching from the first UL Tx chain to the second UL Tx chain based on the at least one indication of the at least one UE capability.

12. The method of claim 1, further comprising transmitting, to a base station, the plurality of UL Tx chains based on a schedule for the number of antenna ports.

13. The method of claim 1, wherein at least one UE capability is based on a default capability associated with a single UL Tx chain of the plurality of UL Tx chains or separate UL Tx chains of the plurality of UL Tx chains when the at least one UE capability is not transmitted to a base station.

14. A method of wireless communication at a base station, comprising:
    receiving, from a user equipment (UE), at least one indication of at least one UE capability, each UE capability indicated by the UE corresponding to a respective frequency band;
    determining, based on the at least one indication of the at least one UE capability, a configuration for switching from a first uplink (UL) transmit (Tx) chain of a plurality of UL Tx chains to a second UL Tx chain of the plurality of UL Tx chains based on a number of antenna ports determined in association with a frequency band that includes one or more component carriers (CCs); and
    transmitting, to the UE, the configuration for switching from the first UL Tx chain to the second UL Tx chain, at least one of the first UL Tx chain or the second UL Tx chain associated with at least one of the one or more CCs or the frequency band.

15. The method of claim 14, further comprising receiving, from the UE, the plurality of UL Tx chains based on a schedule for the number of antenna ports.

16. The method of claim 15, wherein the number of antenna ports corresponds to a maximum number of antenna ports of an individual CC of the one or more CCs, and wherein the one or more CCs is included in one or more frequency bands configured for UL Tx switching.

17. The method of claim 16, wherein the at least one indication of the at least one UE capability is based on a single UL Tx chain of the plurality of UL Tx chains.

18. The method of claim 16, wherein the first UL Tx chain corresponds to the frequency band and the second UL Tx chain corresponds to a different frequency band, at least one of the frequency band or the different frequency band being configured for UL Tx switching.

19. The method of claim 15, wherein the number of antenna ports corresponds to a sum of antenna ports of the one or more CCs, the number of antenna ports being limited to an available number of UE antenna ports when the sum of antenna ports is greater than the available number of UE antenna ports.

20. An apparatus for wireless communication at a user equipment (UE), comprising:
a memory; and
at least one processor coupled to the memory and configured to:
determine a number of antenna ports associated with a frequency band that includes one or more component carriers (CCs), the number of antenna ports based on a plurality of uplink (UL) transmit (Tx) chains for at least one of the one or more CCs or the frequency band; and
switch from a first UL Tx chain of the plurality of UL Tx chains to a second UL Tx chain of the plurality of UL Tx chains, at least one of the first UL Tx chain or the second UL Tx chain associated with the at least one of the one or more CCs or the frequency band.

* * * * *